(12) United States Patent
Hesse et al.

(10) Patent No.: US 11,773,934 B2
(45) Date of Patent: Oct. 3, 2023

(54) CARRIER DISK ASSEMBLY FOR A BRAKE ASSEMBLY AND ELECTROMAGNETICALLY ACTUABLE BRAKE ASSEMBLY WITH A CARRIER DISK ASSEMBLY

(71) Applicant: SEW-EURODRIVE GMBH & CO. KG, Bruchsal (DE)

(72) Inventors: Kerstin Hesse, Östringen (DE); Alex Bechthold, Hambrücken (DE); Christoph Ruhs, Eggenstein-Leopoldshafen (DE); Steffen Essert, Bruchsal (DE); Martin Stober, Linkenheim-Hochstetten (DE); Stefan Aschoff, Karlsruhe (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 503 days.

(21) Appl. No.: 16/967,123

(22) PCT Filed: Jan. 18, 2019

(86) PCT No.: PCT/EP2019/025018
§ 371 (c)(1),
(2) Date: Aug. 3, 2020

(87) PCT Pub. No.: WO2019/149447
PCT Pub. Date: Aug. 8, 2019

(65) Prior Publication Data
US 2020/0362929 A1    Nov. 19, 2020

(30) Foreign Application Priority Data
Feb. 2, 2018 (DE) ..................... 10 2018 000 839.9

(51) Int. Cl.
*F16D 65/12* (2006.01)
*F16D 65/00* (2006.01)
(Continued)

(52) U.S. Cl.
CPC ....... *F16D 65/127* (2013.01); *F16D 65/0006* (2013.01); *F16D 65/123* (2013.01);
(Continued)

(58) Field of Classification Search
CPC ....... F16D 65/123–128; F16D 69/0408; F16D 2065/132; F16D 2065/1324;
(Continued)

(56) References Cited

U.S. PATENT DOCUMENTS 2,580,869 A    1/1952    Winther
3,478,849 A    11/1969    Hahm
(Continued)

FOREIGN PATENT DOCUMENTS

AT           277311 B       12/1969
CN        101983295 A        3/2011
(Continued)

OTHER PUBLICATIONS

Examination report No. 2 for standard patent application issued in corresponding Australian Application No. 2019216188, dated Dec. 3, 2021, pp. 1-3.
(Continued)

*Primary Examiner* — Christopher P Schwartz
(74) *Attorney, Agent, or Firm* — CARTER, DELUCA & FARRELL LLP

(57) ABSTRACT

In a carrier disk assembly for a brake assembly, and an electromagnetically actuable brake assembly with a carrier disk assembly, the carrier disk assembly has a hub part, two friction linings, and two disks. The disks are connected to the hub part, in particular with the aid of axially directed screws. Each one of the disks has a surface region provided with first depressions. A first friction lining is bonded and/or glued to the first disk in the surface region of the first of the two disks, and a second friction lining is bonded and/or
(Continued)

glued to the second disk in the surface region of the second of the two disks.

40 Claims, 7 Drawing Sheets

(51) Int. Cl.
*F16D 69/04* (2006.01)
*F16D 65/02* (2006.01)
*F16D 121/22* (2012.01)

(52) U.S. Cl.
CPC ....... *F16D 65/125* (2013.01); *F16D 69/0408* (2013.01); *F16D 2065/132* (2013.01); *F16D 2065/1324* (2013.01); *F16D 2069/0441* (2013.01); *F16D 2069/0466* (2013.01); *F16D 2121/22* (2013.01); *F16D 2250/0038* (2013.01); *F16D 2250/0069* (2013.01)

(58) Field of Classification Search
CPC ..... F16D 2069/0441; F16D 2069/0466; F16D 2121/22; F16D 2250/0038; F16D 2250/0069
USPC .............................. 188/18 A, 218 A, 218 XL
See application file for complete search history.

(56) References Cited

U.S. PATENT DOCUMENTS

| | | | |
|---|---|---|---|
| 4,072,219 A | 2/1978 | Tahm et al. | |
| 4,967,893 A * | 11/1990 | Vogele | F16D 13/646 188/218 XL |
| 5,143,184 A | 9/1992 | Snyder et al. | |
| 5,358,684 A * | 10/1994 | Valentin | B22F 1/0003 419/45 |
| 5,612,110 A | 3/1997 | Watremez | |
| 5,823,301 A | 10/1998 | Bildner et al. | |
| 6,241,055 B1 * | 6/2001 | Daudi | F16D 65/128 188/218 XL |
| 8,408,369 B2 * | 4/2013 | Woychowski | F16D 65/12 188/218 XL |
| 9,638,276 B2 * | 5/2017 | Schluck | B23K 26/354 |
| 10,145,430 B2 * | 12/2018 | Chen | F16D 65/123 |
| 2008/0060891 A1 * | 3/2008 | Chen | F16D 65/125 188/218 XL |
| 2011/0005873 A1 | 1/2011 | Strandberg et al. | |
| 2012/0152669 A1 | 6/2012 | Gasslbauer | |
| 2013/0112514 A1 * | 5/2013 | Hanna | F16D 65/0006 188/218 XL |
| 2013/0133995 A1 * | 5/2013 | Hanna | F16D 65/12 188/218 XL |
| 2015/0129369 A1 * | 5/2015 | Kirkpatrick | F16D 65/126 188/218 XL |

FOREIGN PATENT DOCUMENTS

| | | |
|---|---|---|
| DE | 3317913 A1 | 11/1984 |
| DE | 10154333 A1 | 5/2003 |
| DE | 202012001391 U1 | 2/2012 |
| DE | 102011089125 A1 | 6/2013 |
| DE | 102012018998 B4 | 5/2014 |
| DE | 102014225654 A1 | 6/2016 |
| DE | 102015002310 A1 | 8/2016 |
| DE | 102015122200 A1 | 6/2017 |
| EP | 0626228 A1 | 11/1994 |
| EP | 2009316 A1 | 12/2008 |
| GB | 1433090 A | 4/1976 |
| JP | 2014206183 A * | 10/2014 ............ B29C 70/46 |

OTHER PUBLICATIONS

Chinese Office Action issued in corresponding CN Application No. 201980011207.X dated Jun. 22, 2022, pp. 1-14.
Yu Gang et al., "Laser Manufacturing Process Mechanics" National Defense Industry Press (Jan. 2012) pp. 1-16, with English language abstract.

* cited by examiner

CARRIER DISK ASSEMBLY FOR A BRAKE ASSEMBLY AND ELECTROMAGNETICALLY ACTUABLE BRAKE ASSEMBLY WITH A CARRIER DISK ASSEMBLY

FIELD OF THE INVENTION

The present invention relates to a carrier disk assembly for a brake assembly and to an electromagnetically actuable brake assembly with a carrier disk assembly.

BACKGROUND INFORMATION

German Patent Document No. 10 2015 122 200 describes surface treatment by a laser.
German Patent Document No. 101 54 333 describes a wheel brake.
German Patent Document No. 10 2011 089 125 describes a brake body.
U.S. Pat. No. 2,580,869 describes an electromagnetically actuable clutch.
European Patent Document No. 0 626 228 describes surface cavities, i.e., depressions in a surface.
U.S. Pat. No. 3,478,849 describes a disk brake having a reduced noise configuration.
U.S. Pat. No. 4,072,219 describes a disk brake made up of multiple parts.
German Patent Document No. 33 17 913 describes a brake pad plate for partially lined disk brakes.
U.S. Pat. No. 5,143,184 describes a carbon composite brake featuring noise reduction.
U.S. Pat. No. 5,823,301 describes brake pads.
German Patent Document No. 20 2012 001 391 describes a printed brake disk for bicycles.
U.S. Patent Application Publication No. 2012/0152669 describes a brake pad for a disk brake.
Austrian Patent Document No. 277 311 describes a brake pad having a friction lining.

SUMMARY

Example embodiments of the present invention provide a brake pad carrier of a brake assembly.

According to example embodiments of the present invention, a carrier disk assembly for a brake assembly has a hub part, two friction linings, and two disks. The disks are connected to the hub part, in particular with the aid of axially directed screws. A first of the two disks has a surface region including first depressions, the surface region particularly being disposed on the side of the first disk facing away from the second disk. The second of the two disks also has a surface region including first depressions, the surface region particularly being disposed on the side of the second disk facing away from the first disk. A first friction lining is bonded and/or glued to the first disk in the surface region of the first of the two disks, and a second friction lining is bonded and/or glued to the second disk in the surface region of the second of the two disks.

This is considered advantageous insofar as better adhesion of the bonded connection is able to be achieved with the aid of the depressions. The bonded connection is therefore stable even at high rotational speeds.

According to example embodiments, the first depressions are produced and/or processed using a laser. This has the advantage of achieving cost-effective processing with a high degree of precision. For example, defined shaping is able to be obtained for the depressions. In addition, lower environmentally relevant emissions are produced in comparison with grid blasting.

According to example embodiments, the first depressions are circular, square, kidney-shaped, or rectangular in each case. This has the advantage that the first depressions are able to be produced with an identical shape. In a punctiform configuration, i.e., a circular configuration, only one laser pulse or one laser pulse sequence has to be directed to a spot in order to produce each depression. A non-uniform movement of the laser beam relative to the particular disk also makes it possible to produce kidney-shaped forms of the depressions. The preferred direction of these kidney-shaped forms is, for example, alignable in the radial direction. This results in an even better adhesion. However, rectangular shapes, too, may be oriented in the radial direction in order to improve the adhesion. Instead of the circular form, square forms are possible, in which case the sharp-edged inner corners of the respective square induce better adhesion of the bonding agent.

According to example embodiments, the first depressions have an oval configuration in each case and are aligned in the radial direction. The is to say, the longest extension of the first depressions is particularly aligned in the radial direction and the shortest extension is aligned in the circumferential direction. This has the advantage of achieving a better adhesion of the bonding agent, and thus a better connection, regardless of the rotational direction.

According to example embodiments, the first depressions are set apart from one another at regular intervals in the circumferential direction and/or in the radial direction. This is considered advantageous insofar as a uniform brake force is able to be generated, i.e., in particular a brake force that is independent of the angle of circumference.

According to example embodiments, the two surface regions not only have the first depressions but also second depressions in each case, the second depressions being arranged as grooves or scores extending in the radial direction, in particular, the radial distance range covered by the first depressions being encompassed by the radial distance range covered by the second depressions, and the radial distance range not covered by the first depressions being situated radially within the radial distance range covered by the first depressions, in particular, circular symmetrical, especially punctiform, depressions being provided as first depressions. This offers the advantage that the depressions in the form of radial beams make it possible to achieve an improved adhesion for the bonded connection, but as the radial distance increases, the distance between radial beam-type depressions adjacently situated in the circumferential direction becomes greater in the circumferential direction. With the aid of the second depressions, the adhesive bond in these interspaces disposed in the circumferential direction is likewise able to be improved since second depressions are able to be placed there.

According to example embodiments, the disks are made of aluminum. This has the advantage of allowing for a cost-effective production. In addition, heat that is generated during braking is able to be fanned out. Moreover, the brake pad carrier has a low moment of inertia.

According to example embodiments, the hub part is a steel hub. This is considered advantageous because a stable, cost-effective brake assembly is able to be produced.

According to example embodiments, the hub part has an inner tooth system. This offers the advantage that the hub part is displaceable on the shaft in the axial direction.

According to example embodiments, a damping device is situated axially between the two disks. For example, the damping device is an embossed sheet metal, in particular, a sheet metal having nubs molded thereon, or a piece of paper or a plastic piece. This is considered advantageous insofar as a noise reduction is able to be achieved during braking and the brake forces introduced via the first friction lining are separated from the adhesive bond of the other friction lining.

According to example embodiments, the hub part and the disks are arranged concentrically with respect to one another, the disks being accommodated on the hub part, the disks having an identical configuration and being placed so as to be in direct contact with each other, in particular, the disks are arranged as perforated disks, in particular as hollow cylinders. This offers the advantage of allowing for an uncomplicated production.

According to example embodiments, the first disk has a coding, produced with the aid of a laser, in a region of the surface of the first disk that is radially set apart from the surface region of the first disk. The radial distance range covered by the region is situated radially within the radial distance range covered by the surface region, the coding, in particular, having a data matrix code. This offers the advantage of allowing the depressions and the coding to be produced in the same production step.

According to an example embodiment of the present invention, in an electromagnetically actuable brake assembly with a carrier disk assembly, the carrier disk assembly functions as a brake pad carrier of the brake assembly, and the brake assembly includes: an armature plate; a coil; a magnet holder; a part having a brake surface; and a shaft which is able to be decelerated. The shaft able to be decelerated has an outer tooth system or is connected in a torsionally fixed manner to a component having an outer tooth system. The inner tooth system of the hub part is engaged with the outer tooth system such that the hub part is connected to the shaft in a keyed manner in the circumferential direction and is situated on the shaft so as to be displaceable in the axial direction. The armature plate is connected to the magnet holder in the circumferential direction by a keyed connection and is situated so that it is displaceable relative to the magnet holder in the axial direction, in particular with the aid of guide pins connected to the magnet holder. The coil is accommodated in the magnet holder, the coil, arranged as an annular coil, in particular, being accommodated in an annular groove of the magnet holder. The armature plate is axially situated between the magnet holder and the brake pad carrier, and the brake pad carrier is axially situated between the armature plate and the part having the brake surface.

This has the advantage that the brake assembly is able to be used for a shaft to be decelerated at a high rotational speed. The adhesive bond situated in the brake pad carrier is improved.

Example embodiments of the present invention are described in greater detail below with reference to the appended Figures.

DETAILED DESCRIPTION

As illustrated in the Figures, the carrier disk assembly has a steel hub 1, which is provided with an inner tooth system 4 and axially uninterrupted threaded bores for screws 3.

Two disks 3, which rest against each other and are coaxially arranged relative to each other, are connected to steel hub 1 with the aid of screws 3.

Axially directed screws 3 are screwed into the threaded bores and partially project from steel hub 1.

Disks 2 are, for example, made of aluminum.

Disks 2 have a hollow-cylindrical configuration, and the axial direction is aligned in parallel with the cylinder axis of this respective hollow-cylindrical region.

Figure 1:
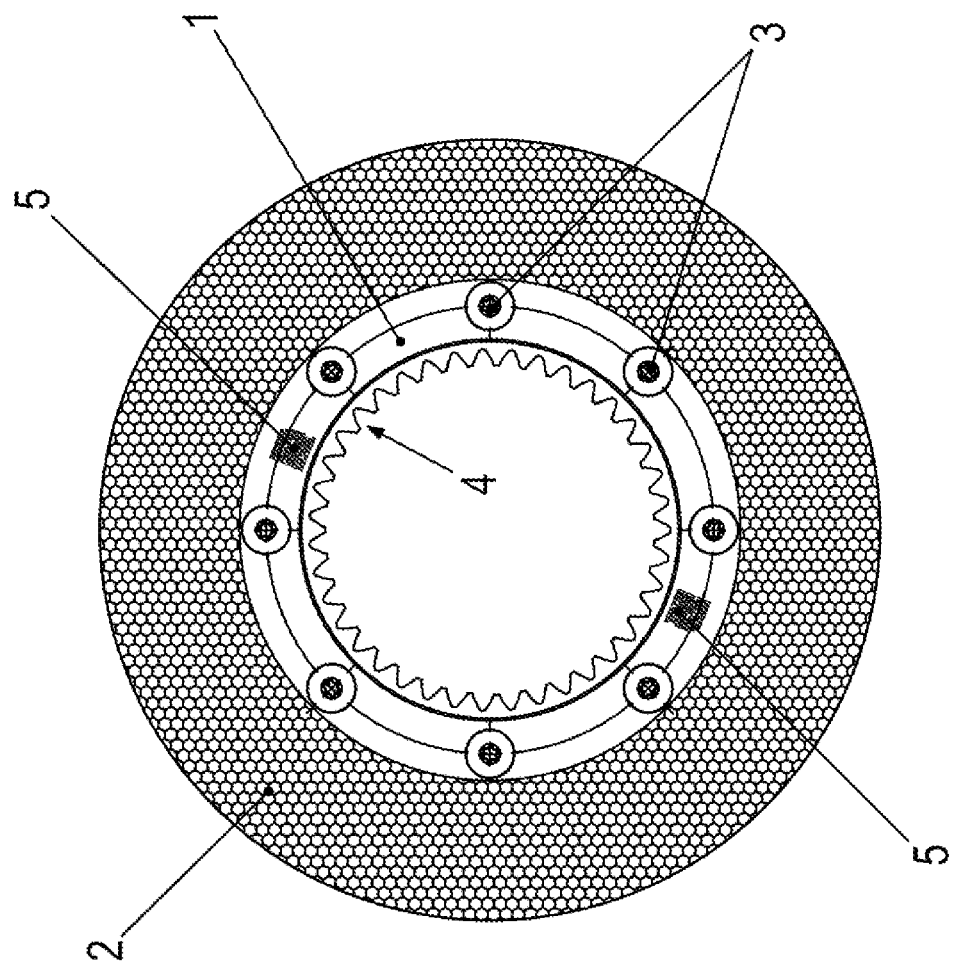
FIG. 1 is a front view of a carrier disk assembly.
Figure 2:
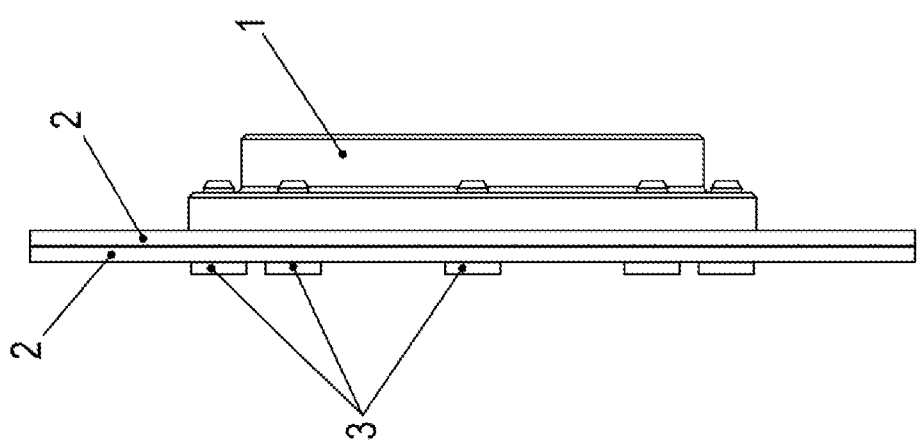
FIG. 2 is a cross-sectional view of the carrier disk assembly.
Figure 3:
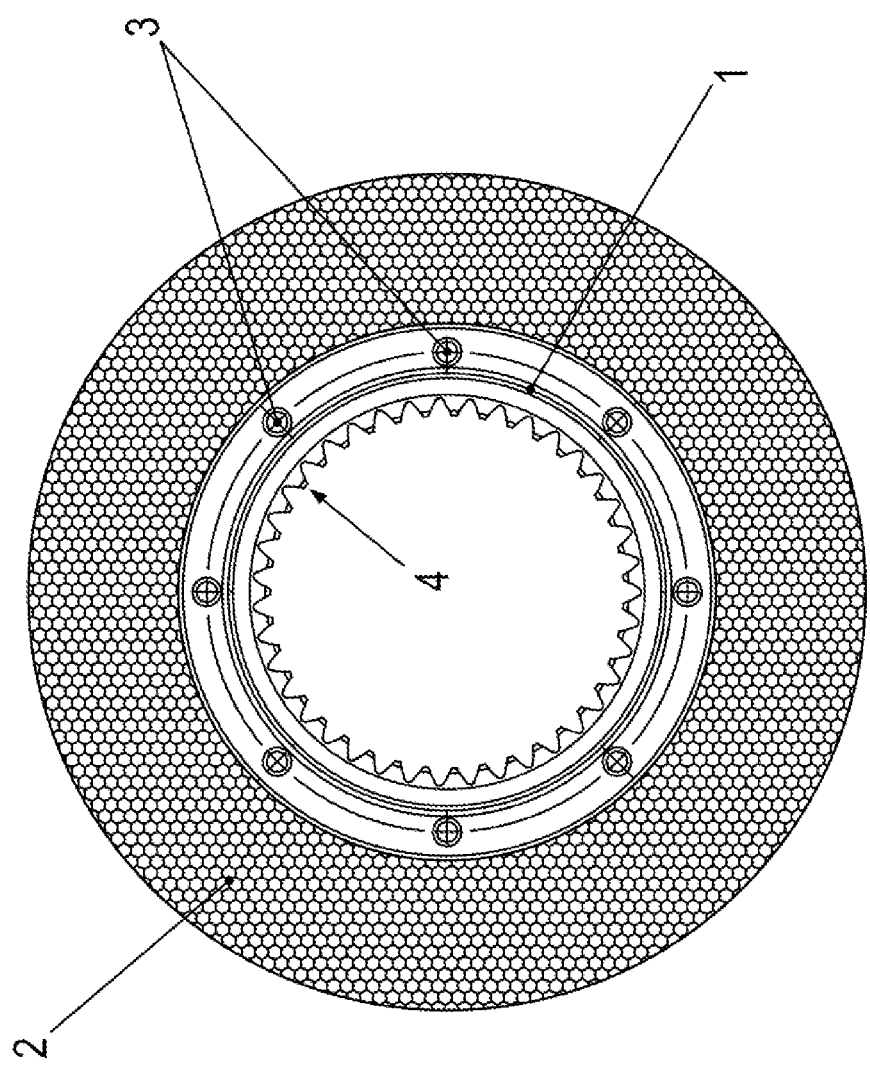
FIG. 3 is an associated rear view of the carrier disk assembly.
Figure 5A:
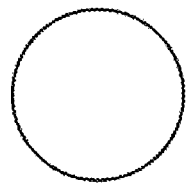
FIGS. 5A to 5F schematically illustrate depressions.

The outer sides of the disks 2 are processed by a laser so that they include depressions 30, e.g., circular depressions as schematically illustrated, for example, in FIGS. 1, 3, and 5A. The carrier disk assembly therefore has a surface region that is processed by a laser on its axial front side and rear side.

The surface region situated on the front side on a first one of disks 2 is, for example, an annular ring.

The surface region situated on the rear side on the other disk 2 is, for example, also an annular ring.

In this manner, friction linings 10 are able to be connected to disks 2 with the aid of an adhesive bond, the processed surface regions bringing about a particularly satisfactory adhesion of the adhesive bond, in particular the glue. With the aid of the depressions, the glue has a better connection than in a surface region without depressions.

The depressions are arranged in the shape of points because a laser pulse is directed toward, and acts on, the center point of each depression during the processing. Each depression therefore has a rotational symmetry with respect to its center axis.

A first of disks 2 has a coding 5, which is applied with the aid of the laser on the surface of disk 2. The laser processing as a single processing step thus creates not only the surface region made coarser by the depressions but also the region provided with coding 5.

Coding 5, for example, includes type sign data.

For example, coding 5 is provided in a radial distance range that is radially set apart from the particular radial distance range covered by the surface region processed by the laser.

For example, the depressions are set apart from one another at regular intervals in the circumferential direction. During braking, the friction linings bonded to the disks therefore generate a substantially constant braking torque. In the same manner, even spacing in the radial direction is, for example, provided.

Figure 7:
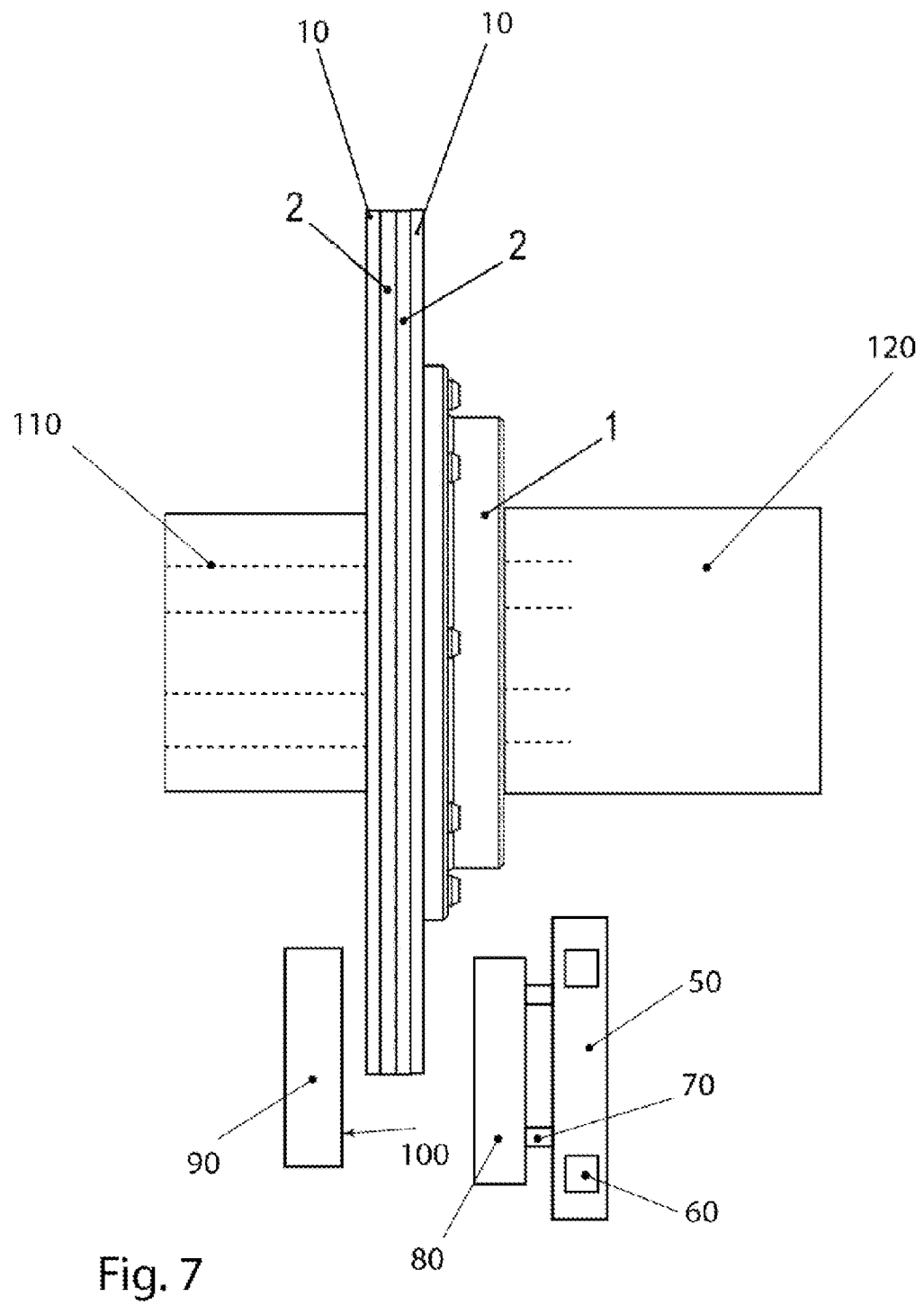
FIG. 7 is a schematic cross-sectional view of a brake assembly.

As described, the friction linings are adhesively bonded to disks 2, which are produced from aluminum. Since disks 2 are screw-fitted with steel hub 1 provided with an inner tooth system with the aid of screws 3, the thereby formed brake pad carrier is able to be placed onto a shaft 120 provided with a corresponding outer tooth system 110. In this regard, reference is made to, for example, FIG. 7. The inner tooth system and the outer tooth system thus engage with each other and the shaft is connected to the brake pad carrier in a keyed manner in the circumferential direction. In the axial direction, i.e., in the direction of the axis of rotation of the shaft, the brake pad carrier is situated on the shaft in a displaceable manner.

The shaft is rotatably mounted in a housing part with the aid of a bearing. The housing part is connected to a magnet holder 50 in a torsionally fixed manner, in particular with the aid of axially directed and positioned pins.

The magnet holder 50 is produced from a ferromagnetic material such as cast steel, and on its side facing the brake pad carrier it has an annular groove in which an annular coil 60 is accommodated, in particular a brake coil. This annular coil 60 is, for example, surrounded, especially retained, in the annular groove by casting compound.

Situated axially between the brake pad carrier and the annular coil is an armature plate 80, which is connected to the magnet holder 50 in a torsionally fixed manner and disposed so as to allow for an axial movement. Toward this end, the pins 70 are guided through axially uninterrupted recesses in the armature plate 80. The pins are partially inserted into axially directed bores of the magnet holder 50.

A spring element supported on the magnet holder 50 presses the armature plate 80 against a first friction lining 10 of the brake pad support, in particular, when the annular coil 60 is not energized, the brake pad support being pressed by its second friction lining 10 against a brake surface 100 arranged on a housing part 90. This friction lining 10 is situated on the side of the brake pad carrier axially facing the armature plate 80. When the annular coil 60 is energized, on the other hand, the armature plate 80 is pulled toward the annular coil 60, and the armature disk overcomes the spring force.

In additional exemplary embodiments, the outer tooth system is not directly worked into the outer circumference of the shaft but is arranged as a toothing of a tooth system part, in particular, a slip pinion, and the shaft is connected to the tooth system part in a torsionally fixed manner, in particular, by a feather key connection.

In the event of a power loss, the brake assembly is applied, and when the annular coil is energized, lifting of the brake is induced.

This brake assembly having the brake pad carrier is able to be provided in or on an electric motor. The shaft is connected to the rotor shaft of the electric motor in a torsionally fixed manner or produced as one piece, i.e., in an integral fashion.

Figure 4:
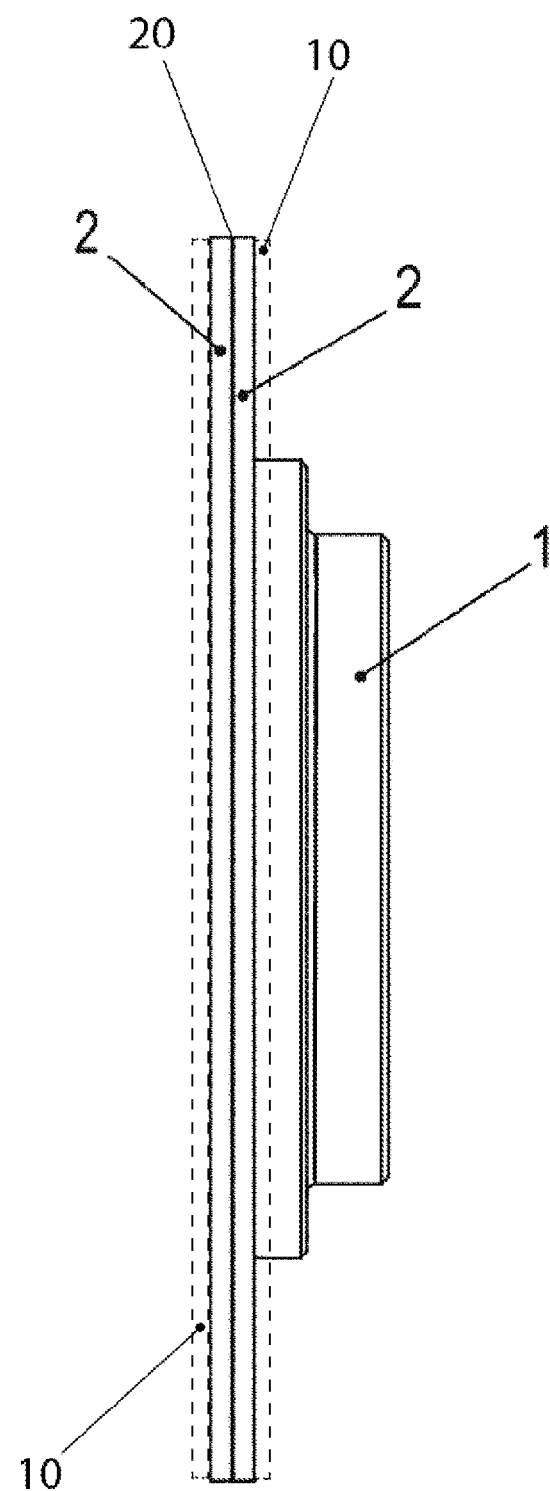
FIG. 4 is a schematic cross-sectional view of a carrier disk assembly.

In further exemplary embodiments, the two disks 2 do not have direct contact but are set apart via an axially interposed damping device 20. Its wall thickness is, for example, smaller than the wall thickness of each of the two disks 2. An embossed sheet metal, a plastic part or paper, in particular NOMEX paper, may be used as the damping device 20. In this regard, reference is made, for example, to FIG. 4, for example. In exemplary embodiments, the hub 1 and the disk 2 are integrally formed, i.e., as one piece. In this regard, reference is again made, for example, to FIG. 4.

In additional exemplary embodiments, the depressions, in particular the depressions situated at the same radial distance, are not spaced apart from one another at regular intervals in the circumferential direction. This reduces the oscillation tendency of the overall system with the carrier disk assembly during braking because multiple frequencies that have a smaller amplitude occur rather than a single oscillating-exciting frequency. Even if the total system were to have a risk-prone resonant frequency, not enough energy to induce dangerously strong amplitudes of the resonant oscillation is thus introduced into the associated excitation frequency. The noise emission is therefore also able to be reduced.

Figure 5B:
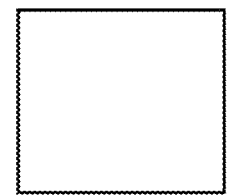
Figure 5C:
Figure 5D:
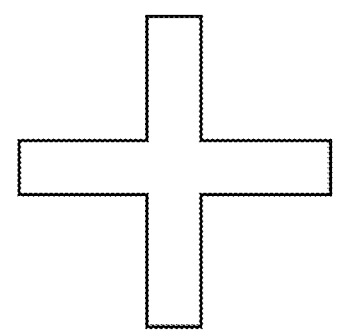
Figure 5E:
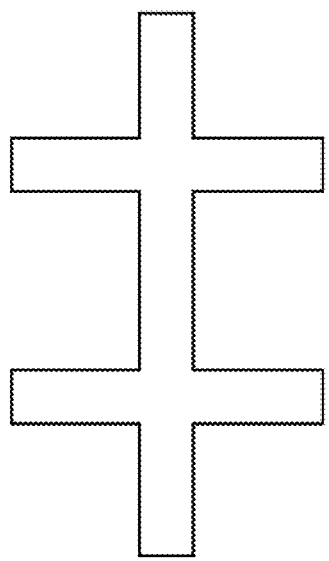
Figure 5F:
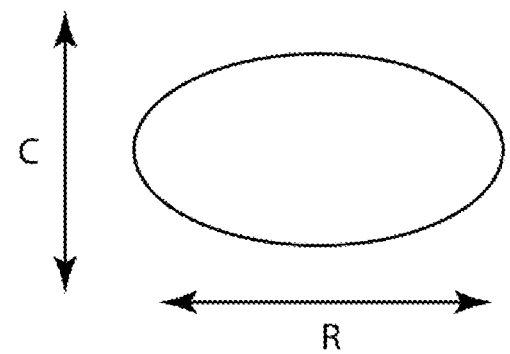

In further exemplary embodiments, oval depressions, e.g., as schematically illustrated, for example, in FIG. 5F, instead of the punctiform depressions are produced by the laser, the oval depressions having a radial orientation, i.e., extending farther in the radial direction R than in the circumferential direction C. Punctiform depressions are, for example, also disposed in a radial distance range situated radially within the radial distance range also covered by the oval depressions.

The adhesion is therefore improved even under the action of brake forces.

Figure 6:
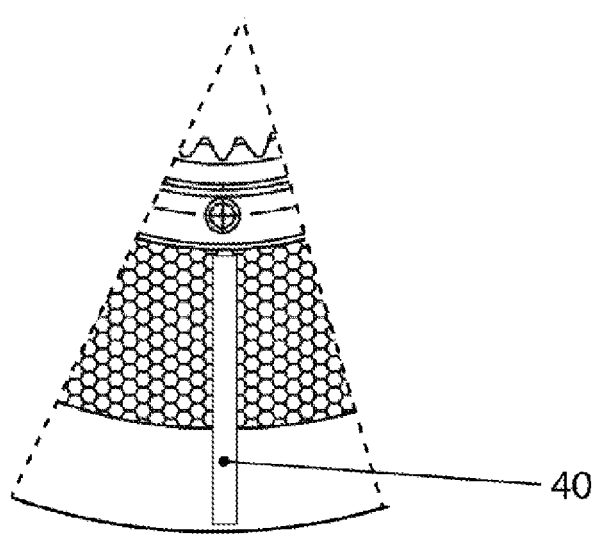
FIG. 6 is a schematic front view of a portion of a carrier disk assembly.

In further exemplary embodiments, radially directed scores or grooves 40, e.g., as schematically illustrated, for example, in FIG. 6, are produced with the aid of the laser. Present in addition are punctiform depressions, in particular in the radially outer region of the respective surface region.

In further exemplary embodiments, the depressions 30 are not circular or oval but kidney-shaped, e.g., as schematically illustrated, for example, in FIG. 5C, square or rectangular, e.g., as schematically illustrated, for example, in FIG. 5B. This makes it possible to achieve an even better adhesion as a function of the material of the friction lining and the adhesive agent situated between the friction lining and the disk.

In further exemplary embodiments, the depressions 30 have the form of a cross, e.g., as schematically illustrated, for example, in FIG. 5D, or double cross, e.g., as schematically illustrated, for example, in FIG. 5E, the cross or crosses in particular being non-rectangular.

LIST OF REFERENCE NUMERALS 1 steel hub including inner tooth system 4 and threaded bores for screws 3
2 aluminum disk
3 screws
4 inner tooth system
5 coding, in particular data matrix code
10 friction lining
20 damping device
30 depression
40 scores or grooves
50 magnet holder
60 coil
70 guide pin
80 armature plate
90 part having brake surface 100
100 brake surface
110 outer tooth system
120 shaft
R radial direction
C circumferential direction

The invention claimed is:
1. A carrier disk assembly for a brake assembly, comprising:
a hub part;
at least one friction lining;
a first disk connected to the hub part; and
a damping device axially arranged between the first disk and a further disk of the carrier disk assembly;
wherein the disk includes a surface region that is provided with first depressions, and a first friction lining is glued to the disk in the surface region of the disk.

2. The carrier disk assembly according to claim 1, wherein the first disk is connected to the hub part by axially-directed screws.

3. The carrier disk assembly according to claim 1, wherein the first depressions are produced and/or processed with the aid of a laser.

4. The carrier disk assembly according to claim 1, wherein the first depressions have a geometrically identical development and/or the same size.

5. The carrier disk assembly according to claim 1, wherein the first depressions are circular, square, kidney-shaped, and/or rectangular and/or the first depressions are arranged in the form of a cross and/or double cross.

6. The carrier disk assembly according to claim 1, wherein the first depressions have an oval configuration and are aligned in a radial direction.

7. The carrier disk assembly according to claim 6, wherein a longest extension of the first depressions is aligned in the radial direction and shortest extension of the first depressions is aligned in a circumferential direction.

8. The carrier disk assembly according to claim 1, wherein the first depressions are set apart from one another at regular intervals in a circumferential direction and/or in a radial direction.

9. The carrier disk assembly according to claim 1, wherein the hub and the first disk are integrally formed.

10. The carrier disk assembly according to claim 9, wherein the hub and the first disk are formed of steel.

11. The carrier disk assembly according to claim 1, wherein the damping device includes an embossed sheet metal part, a sheet metal part having nubs molded thereon, a piece of paper, and/or or a plastic piece.

12. The carrier disk assembly according to claim 1, wherein the surface region includes second depressions arranged as grooves and/or scores extending in a radial direction.

13. The carrier disk assembly according to claim 12, wherein a radial distance range covered by the first depressions is encompassed by a radial distance range covered by the second depressions, and a radial distance range not covered by the first depressions is arranged radially within the radial distance range covered by the first depressions.

14. The carrier disk assembly according to claim 1, wherein the first depressions are arranged as circular symmetrical and/or punctiform depressions.

15. The carrier disk assembly according to claim 1, wherein the first disk is formed of aluminum and/or the hub part is arranged as a steel hub.

16. The carrier disk assembly according to claim 1, wherein the hub part has an inner tooth system.

17. The carrier disk assembly according to claim 1, wherein the hub part and the first disk are arranged concentrically with respect to one another, and the first disk is accommodated on the hub part.

18. The carrier disk assembly according to claim 1, wherein the first disk is arranged as a perforated disk and/or a hollow cylinder.

19. The carrier disk assembly according to claim 1, wherein the first disk includes a coding, produced with the aid of a laser, in a region of a surface of the first disk that is radially set apart from the surface region of the first disk, a radial distance range covered by the region being arranged radially within a radial distance range covered by the surface region.

20. The carrier disk assembly according to claim 19, wherein the coding includes a data matrix code.

21. A carrier disk assembly for a brake assembly, comprising:
a hub part;
two friction linings;
two disks connected to the hub part; and
a damping device disposed axially between the two disks;
wherein a first disk of the two disks includes a surface region including first depressions and being disposed on a side of the first disk facing away from a second disk of the two disks, the second disk includes a surface region including first depressions and disposed on a side of the second disk facing away from the first disk;
wherein a first friction lining is glued to the first disk in the surface region of the first disk, a second friction lining is glued to the second disk in the surface region of the second disk, the first depressions being produced and/or processed using a laser.

22. The carrier disk assembly according to claim 21, wherein the two disks are connected to the hub part by axially directed screws.

23. The carrier disk assembly according to claim 21, wherein the first depressions have a geometrically identical development and/or the same size.

24. The carrier disk assembly according to claim 21, wherein the first depressions are circular, square, kidney-shaped, and/or rectangular and/or the first depressions are arranged in the form of a cross and/or double cross.

25. The carrier disk assembly according to claim 21, wherein the first depressions have an oval configuration and are aligned in a radial direction.

26. The carrier disk assembly according to claim 25, wherein a longest extension of the first depressions is aligned in the radial direction and a shortest extension of the first depressions is aligned in a circumferential direction.

27. The carrier disk assembly according to claim 21, wherein the first depressions are set apart from one another at regular intervals in a circumferential direction and/or in a radial direction.

28. The carrier disk assembly according to claim 21, wherein the hub and the two disks are integrally formed.

29. The carrier disk assembly according to claim 28, wherein the hub and the two disks are formed of steel.

30. The carrier disk assembly according to claim 21, wherein the damping device includes an embossed sheet metal part, a sheet metal part having nubs molded thereon, a piece of paper, and/or a plastic piece.

31. The carrier disk assembly according to claim 21, wherein the two surface regions include second depressions arranged as grooves and/or scores extending in a radial direction.

32. The carrier disk assembly according to claim 31, wherein a radial distance range covered by the first depressions is encompassed by a radial distance range covered by the second depressions, and a radial distance range not covered by the first depressions is arranged radially within the radial distance range covered by the first depressions.

33. The carrier disk assembly according to claim 21, wherein the first depressions are arranged as circular symmetrical and/or punctiform depressions.

34. The carrier disk assembly according to claim 21, wherein the disks are formed of aluminum and/or the hub part is arranged as a steel hub.

35. The carrier disk assembly according to claim 21, wherein the hub part includes an inner tooth system.

36. The carrier disk assembly according to claim 21, wherein the hub part and the disks are arranged concentrically with respect to one another, the disks are accommodated on the hub part, have an identical configuration, and are placed in direct contact with each other.

37. The carrier disk assembly according to claim 21, wherein the disks are arranged as perforated disks and/or as hollow cylinders.

38. The carrier disk assembly according to claim 21, wherein the first disk includes a coding, produced with the aid of a laser, in a region of a surface of the first disk that is radially set apart from the surface region of the first disk, a radial distance range covered by the region being arranged radially within a radial distance range covered by the surface region.

39. The carrier disk assembly according to claim 38, wherein the coding includes a data matrix code.

40. An electromagnetically actuable brake assembly, comprising:
- a carrier disk assembly arranged as a brake pad carrier of the brake assembly and including:
  - (a) a hub part, at least one friction lining, and a disk connected to the hub part, the disk including a surface region that is provided with first depressions, a first friction lining being bonded and/or glued to the disk in the surface region of the disk; and/or
  - (b) a hub part, two friction linings, two disks connected to the hub part, and a damping device disposed axially between the two disks, a first disk of the two disks including a surface region including first depressions and being disposed on a side of the first disk facing away from a second disk of the two disks, the second disk including a surface region including first depressions and disposed on a side of the second disk facing away from the first disk, a first friction lining being bonded and/or glued to the first disk in the surface region of the first disk, a second friction lining being bonded and/or glued to the second disk in the surface region of the second disk, the first depressions being produced and/or processed using a laser;
- an armature plate;
- a coil;
- a magnet holder;
- a part having a brake surface; and
- a shaft adapted to be decelerated;
- wherein the shaft includes an outer tooth system and/or is connected in a torsionally fixed manner to a component having an outer tooth system, an inner tooth system of the hub part being engaged with the outer tooth system such that the hub part is connected to the shaft in a keyed manner in a circumferential direction and is situated on the shaft displaceably in an axial direction, the armature plate being connected to the magnet holder by a keyed connection in the circumferential direction and is displaceable relative to the magnet holder in the axial direction, with the aid of guide pins connected to the magnet holder;
- wherein the coil is accommodated in the magnet holder, and the coil, arranged as an annular coil, is accommodated in an annular groove of the magnet holder, the armature plate being axially arranged between the magnet holder and the brake pad carrier; and wherein the brake pad carrier is axially arranged between the armature plate and the part having the brake surface.

* * * * *